(12) United States Patent
Stapleton

(10) Patent No.: US 12,200,114 B1
(45) Date of Patent: Jan. 14, 2025

(54) SYSTEMS AND METHODS FOR MOBILE QUANTUM KEY DISTRIBUTION

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 479 days.

(21) Appl. No.: 17/451,800

(22) Filed: Oct. 21, 2021

(51) Int. Cl.
  *H04L 9/08* (2006.01)

(52) U.S. Cl.
  CPC .......... *H04L 9/0852* (2013.01); *H04L 9/0825* (2013.01); *H04L 9/0861* (2013.01)

(58) Field of Classification Search
  CPC .... H04L 9/0852; H04L 9/0825; H04L 9/0861
  See application file for complete search history.

(56) References Cited

U.S. PATENT DOCUMENTS

| | | | | |
|---|---|---|---|---|
| 10,630,478 | B1 * | 4/2020 | Yavuz | H04L 9/321 |
| 2011/0213979 | A1 | 9/2011 | Wiseman et al. | |
| 2013/0101121 | A1 | 4/2013 | Nordholt et al. | |
| 2013/0208894 | A1 * | 8/2013 | Bovino | H04L 9/0852 |
| | | | | 380/278 |
| 2015/0236791 | A1 * | 8/2015 | Nordholt | H04B 10/501 |
| | | | | 398/184 |
| 2016/0013936 | A1 * | 1/2016 | Hughes | H04W 12/041 |
| | | | | 380/279 |
| 2018/0062838 | A1 * | 3/2018 | Godfrey | H04L 9/0855 |
| 2019/0149327 | A1 * | 5/2019 | Yuan | H04L 9/0852 |
| | | | | 380/255 |
| 2019/0280859 | A1 * | 9/2019 | Kwiat | H04L 9/0822 |
| 2020/0118026 | A1 * | 4/2020 | Ashrafi | G06N 10/00 |
| 2021/0083864 | A1 * | 3/2021 | Bush | H04L 9/088 |
| 2021/0211271 | A1 * | 7/2021 | Kuang | H04L 9/065 |
| 2022/0094442 | A1 * | 3/2022 | Isaacson | G06N 10/60 |
| 2022/0103355 | A1 * | 3/2022 | Lo | H04L 9/0656 |

(Continued)

FOREIGN PATENT DOCUMENTS

| | | | | |
|---|---|---|---|---|
| EP | 3955509 A1 * | 2/2022 | | G06F 7/588 |
| WO | WO-2012044855 A2 * | 4/2012 | | H04L 63/062 |

(Continued)

OTHER PUBLICATIONS

Consumer QKD, Quantum Communications Hub, https://www.quantumcommshub.net/industry-government-media/our-technologies/consumer-qkd/, 2021.

*Primary Examiner* — Darshan I Dhruv
(74) *Attorney, Agent, or Firm* — K&L Gates LLP

(57) ABSTRACT

Systems, apparatuses, methods, and computer program products are disclosed for mobile quantum key distribution (MQKD). An example method includes establishing a first connection between a MQKD device and a first device. The example method further includes generating a pair of entangled particles and injecting quantum data that is based on a first particle of the pair of entangled particles into the first device. The example method further includes establishing a second connection between the MQKD device and a host device and injecting quantum data that is based on a second particle of the pair of entangled particles into the host device to facilitate secure communication between the host device and the first device based at least on the pair of entangled particles.

18 Claims, 9 Drawing Sheets

(56) References Cited

U.S. PATENT DOCUMENTS

| | | | | |
|---|---|---|---|---|
| 2022/0141008 A1* | 5/2022 | Lim | ............... | H04L 9/0855 |
| | | | | 380/278 |
| 2022/0166612 A1* | 5/2022 | Ghazisaeidi | ........ | H04L 9/0825 |
| 2022/0173895 A1* | 6/2022 | Lord | ............... | H04B 10/70 |
| 2022/0393864 A1* | 12/2022 | Doi | ............... | H04L 9/002 |
| 2023/0196165 A1* | 6/2023 | Li | ............... | G06N 10/60 |
| | | | | 706/6 |
| 2023/0353350 A1* | 11/2023 | Ho | ............... | H04L 9/0858 |
| 2023/0393335 A1* | 12/2023 | Challener | ............ | H04L 9/0852 |

FOREIGN PATENT DOCUMENTS

| | | | | |
|---|---|---|---|---|
| WO | WO-2021055000 A1 * | 3/2021 | ............ | G06N 10/00 |
| WO | WO-2022251944 A1 * | 12/2022 | ............ | H04B 10/70 |

\* cited by examiner

SYSTEMS AND METHODS FOR MOBILE QUANTUM KEY DISTRIBUTION

BACKGROUND

Quantum Key Distribution (QKD) is a method for establishing a shared key between two communicating parties. QKD invokes a protocol that relies upon quantum phenomena to mitigate the risk of a man-in-the-middle attack, wherein a third party intercepts a transmission between parties to capture the shared key.

BRIEF SUMMARY

In a traditional QKD implementation, a QKD device generates two streams of quantum entangled particles (e.g., photons) and sends one stream to a first device (Alice) and another to a second device (Bob). Typically, one of the participants manages the QKD device, but it could be managed by a third party. Alice and Bob both read the received entangled particles, interpreting the same string of binary zeroes and ones. Alice and Bob can use a separate communications channel to statically verify that they have read and interpreted the entangled particles correctly. A device reading any photon will affect the state of that photon, so through a variety of operations, Alice and Bob are able to determine whether an attacker (e.g., Eve) using a third device has intercepted any of the transmitted photons. As a result, Alice and Bob are able to use only photons that were not intercepted as the basis for generation of a key known only to each other. That key can then be used for secure communications. However, such implementations of QKD require dedicated equipment with clear and reliable channels for network communication, including agreed-upon protocols and processes, and thus are not readily applicable for situations in which secret keys must be exchanged between remote locations, some of which may use legacy devices.

Accordingly, most distributions of secret keys today do not rely upon QKD solutions, and instead use other methods. For instance, many secret keys are injected into devices within a Key Injection Facility (KIF), which is a physically secure room. After receipt of one or more secret keys within a KIF, a device can thereafter be shipped to remote locations where it can utilize the injected secret keys. To facilitate this process, such devices often include a Secure Cryptographic Device (SCD) that provides physically and logically protected cryptographic services and storage (e.g., a PIN entry device (PED) or Hardware Security Module (HSM)) into which the secret key(s) are injected. For instance, an SCD may be integrated into a larger system such as an automated teller machine (ATM) or point-of-sale (POS) terminal, and after injection of one or more secret keys into the integrated SCD, the larger system may thereafter be deployed to its ultimate destination for use in commerce.

Another common method for exchange keys today uses a SCD as a portable Key Loading Device (KLD), which is a mobile device that can physically transport and inject keys outside of a key injection facility (KIF). Keys are prepared at the KIF and transferred from a secure cryptographic device (SCD) to the KLD. The KLD is then physically transported to a remote device and the prepared keys are transferred to the SCD of the remote device. Thus, secure communication between the remote device and a host device may be established. However, KLDs are expensive, and in order to utilize KLDs users must be trained, as well as trusted, to ensure that the cryptographic keys are not compromised. Additionally, records indicating where and when keys have been injected must be manually managed (e.g., by the user transporting the KLD) to further ensure that the cryptographic keys are not compromised. Further, transporting the keys inside the KLD increases the risk of the keys becoming compromised if the KLD is stolen. Accordingly, the inventors have realized that a need exists for new solutions that improve upon traditional tools for secret key exchange that gains the benefits of QKD and existing KLD methods, but that mitigates the various issues noted above.

Systems, apparatuses, methods, devices, and computer program products are disclosed herein for mobile quantum key distribution. Example embodiments described herein leverage a portable Mobile Quantum Key Distribution (MQKD) device capable of both generating and measuring quantum entangled particles. Using the MQKD device, a first set of quantum-entangled particles may be locally injected into a first device using a portable MQKD device, and a second set of particles entangled with corresponding particles in the first set may thereafter be locally injected by the portable MQKD device into a host device. The host device and the first device may thereafter read their respective injected particles to fix the state of the entangled particles at both the host and the first device to establish a unique, secure key known only to the host and the first device (and not known even to the MQKD device). Further, in some embodiments, the MQKD device may inject entangled particles into a series of devices, and then may be brought to a host device to inject the corresponding entangled particles into the host device. The host device may read the entangled particles associated with any particular device of the series of devices to generate a unique, secure key known only to the host device and that particular device.

In one example embodiment, a method is provided for mobile quantum key distribution. From the perspective of a MQKD device, the method includes establishing, by communications hardware of the MQKD device, a first connection between the MQKD device and a first device. The method also includes injecting, by the communications hardware of the MQKD device, first quantum data that is based on a first particle of the pair of entangled particles into the first device via the first connection between the MQKD device and the first device. The method also includes establishing, by the communications hardware of the MQKD device, a second connection between the MQKD device and a host device. The method also includes injecting, by the communications hardware of the MQKD device, second quantum data that is based on a second particle of the pair of entangled particles into the host device via the second connection between the MQKD device and the host device to facilitate secure communication between the host device and the first device based at least on the pair of entangled particles.

In some embodiments, the method also includes determining, by quantum analysis circuitry of the MQKD device, whether the first device is quantum-enabled, and, in response to determining that the first device is not quantum-enabled, injecting the first quantum data into the first device includes generating, by a secure key generator of the MQKD device, a first secure key based on the first particle of the pair of entangled particles. In some embodiments, the method also includes transmitting, by the communications hardware of the MQKD device, the first secure key to the first device. In some embodiments, in response to determining that the first device is quantum-enabled, injecting the first quantum data into the first device includes transmitting, by the communications hardware of the MQKD device, the first particle of the pair of entangled particles to the first device.

In another example embodiment, a MQKD device is provided that includes entangled particles generation hardware configured to generate a pair of entangled particles. The MQKD device also includes communications hardware configured to establish a first connection between the MQKD device and a first device. The communications hardware is also configured to inject first quantum data that is based on a first particle of the pair of entangled particles into the first device via the first connection between the MQKD device and the first device. The communications hardware is also configured to establish a second connection between the MQKD device and a host device. The communications hardware is also configured to inject second quantum data that is based on a second particle of the pair of entangled particles into the host device via the second connection between the MQKD device and the host device to facilitate secure communication between the host device and the first device based at least on the pair of entangled particles.

In some embodiments, the MQKD device also includes quantum analysis circuitry configured to determine whether the first device is quantum enabled. In some embodiments, the MQKD device also includes a secure key generator configured to, in response to determining that the first device is not quantum-enabled, generate a first secure key based on the first particle of the pair of entangled particles. In some embodiments, the communications hardware is also configured to, in response to determining that the first device is not quantum-enabled, inject the first quantum data into the first device by transmitting the first secure key to the first device. In some embodiments, the communications hardware is also configured to, in response to determining that the first device is quantum-enabled, inject the first quantum data into the first device by transmitting the first particle of the pair of entangled particles to the first device.

In another example embodiment, a MQKD device is provided that includes means for establishing a first connection between the MQKD device and a first device. The MQKD device also includes means for generating a pair of entangled particles. The MQKD device also includes means for injecting first quantum data that is based on a first particle of the pair of entangled particles into the first device via the first connection between the MQKD device and the first device. The MQKD device also includes means for establishing a second connection between the MQKD device and a host device. The MQKD device also includes means for injecting second quantum data that is based on a second particle of the pair of entangled particles into the host device via the second connection between the MQKD device and the host device to facilitate secure communication between the host device and the first device based at least on the pair of entangled particles.

In another example embodiment, a method is provided for mobile quantum key distribution. From the perspective of a first device (e.g., a remote device or a host device), the method includes receiving, by communications hardware of the first device, quantum data from a mobile quantum key distribution (MQKD) device. The method also includes processing, by the first device, the quantum data to facilitate secure communication between the first device and a second device.

In another example embodiment, a device may be designed to permit mobile quantum key distribution. To do this, the device may include communications hardware configured to receive quantum data from a mobile quantum key distribution (MQKD) device. The device may be configured to process received quantum data to facilitate secure communication with another device.

In another example embodiment, a device may be designed to permit mobile quantum key distribution. To do this, the device includes means for receiving quantum data from a mobile quantum key distribution (MQKD) device. In addition, the device also includes means for processing the quantum data to facilitate secure communication with another device.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
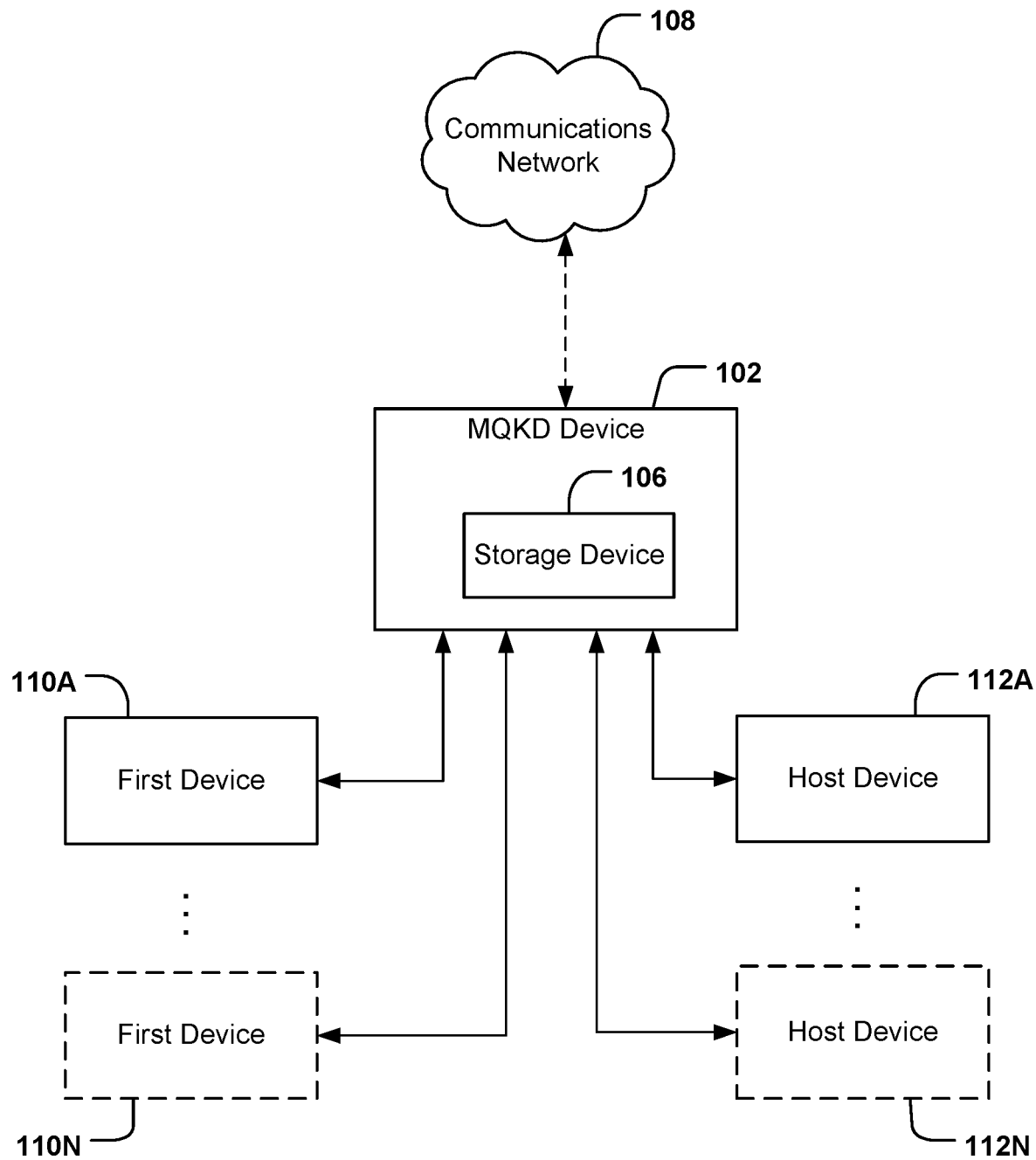
FIG. 1 illustrates a system in which some example embodiments may be used for mobile quantum key distribution, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" or "device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smart-watches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "Mobile Quantum Key Distribution (MQKD) device" refers to a device, such as a KLD, that is mobile, portable, handheld, and/or otherwise capable of being transported by a human, drone, robot, and/or other entity. In some examples, a MQKD device may mobile such that the MQKD device be embodied by a vehicle, such as, for example, an unmanned aerial vehicle such as a drone, robot, and/or the like, which may be remote controlled or autonomous. A MQKD device may include one or more connection ports or the like suitable to transmit entangled particles. For example, communications hardware 206 of a MQKD device may comprise a connection port for a fiber-optic cable. As another example, a MQKD device may comprise a laser port. More broadly, a MQKD device includes connection ports of one kind or another that are suitable to inject data (e.g., entangled particles, secure keys, and/or the like) into devices which may or may not be quantum-enabled (e.g., able to receive and process quantum entangled particles). A MQKD device may be configured to generate entangled particles, measure entangled particles, and generate secure keys. These capabilities are further discussed below with reference to FIGS. 2A-6.

The term "quantum data" refers to data generated and transmitted by a MQKD device. In some embodiments, quantum data may comprise one or more entangled particles. In some embodiments, quantum data may comprise a secure key (e.g., a key based on measurement of one or more entangled particles generated by a MQKD device).

Overview

As noted above, methods, apparatuses, systems, and computer program products are described herein that provide for mobile quantum key distribution. Traditionally, it has been very difficult to perform QKD, as conventional tools for QKD rely on purpose-built equipment and clear and reliable quantum and classical communication channels. Similarly, traditional operations for key distribution using PKLDs suffer from the potential compromise of keys that are maintained by the PKLD.

In contrast to these conventional techniques for key distribution, example embodiments described herein leverage the fact that the generation of quantum entangled particles is becoming faster, more efficient, and able to be performed using smaller hardware and less energy. Thus, example embodiments utilize a handheld, mobile, and/or otherwise portable MQKD device to generate and inject entangled particles into multiple devices across different locations and then inject corresponding entangled particles into a host device. In various embodiments, the devices can then establish a unique key per device for secure communications. Since only each device and the host have access to the corresponding entangled particles, each respective device and the host can mutually authenticate using keys for which there is a high assurance level that no other party will be able to access. Further, as described below, the MQKD device may be backwards-compatible, and able to distinguish between, and successfully work with, devices that are quantum-enabled and those that are not. In this regard, as the MQKD device is transported from device to device, in an instance in which the MQKD device encounters a device which is not quantum-enabled, the MQKD device may generate entangled particles and subsequently generate a secure key which is then injected into the device. While not as secure as embodiments enabling two end-point devices to generate secure keys directly from entangled particles, this approach enables the high-grade security for quantum-enabled devices while still providing legacy interoperability for the installed base of devices that may not yet have such a capability.

Accordingly, the present disclosure sets forth systems, methods, and apparatuses that achieve secret key exchange in a more efficient and secure manner. Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a MQKD device 102 may include a storage device 106. Although storage device 106 is described in singular form, some embodiments may utilize more than one storage device 106. Additionally, some embodiments of the MQKD device 102 may not require a storage device 106 at all. Whatever the implementation, the MQKD device 102, and its constituent storage device(s) 106 may receive and/or transmit information via communications network 108 (e.g., the Internet) and/or directly with any number of other devices, such as one or more of first devices 110A-110N and/or host devices 112A-112N.

MQKD device 102 may receive, process, generate, and transmit data, signals, and electronic information to facilitate the various operations described herein. Particular components of MQKD device 102 are described in greater detail below with reference to apparatus 200 in connection with FIG. 2A-D.

Storage device 106 may comprise a distinct component from MQKD device 102, or may comprise an element of MQKD device 102 (e.g., memory 204, as described below in connection with FIG. 2A). Storage device 106 may be embodied as one or more direct-attached storage (DAS) devices (such as hard drives, solid-state drives, optical disc drives, or the like). Storage device 106 may host the software executed to operate the MQKD device 102. Storage device 106 may store information relied upon during operation of the MQKD device 102, such as various streams of entangled particles, secure keys, key check values, and/or the like that may be used by the MQKD device 102, data and files to be analyzed and/or processed using the MQKD device 102, such as log files, or the like.

The one or more first devices 110A-110N may be embodied by any computing and/or storage devices known in the art. For example, in some embodiments, a first device may comprise a stationary device, such as an ATM, POS device, and/or other stationary devices. In some embodiments, an example host device 112A may comprise a server device (e.g., a secure data center or other device hosted within the secure network infrastructure of an organization or entity). And while it may be typical to utilize a single host device 112A, some embodiments may utilize multiple host devices 112A-112N, such as where each host device 112A-112N is associated with a different host organization or entity. Moreover, it will be understood that the one or more first devices 110A-110N and/or the one or more host devices 112A-112N need not be stationary or fixed devices, and need not be devices of any specific kind; rather, in various implementations these devices may be embodied by any computing devices known in the art, such as desktop or laptop computers, tablet devices, smartphones, or the like. Moreover, the one or more first devices 110A-110N and the one or more host devices 112A-112N need not themselves be independent devices, but may be peripheral devices communicatively coupled to other computing devices.

Example Implementing Apparatuses

Figure 2A:
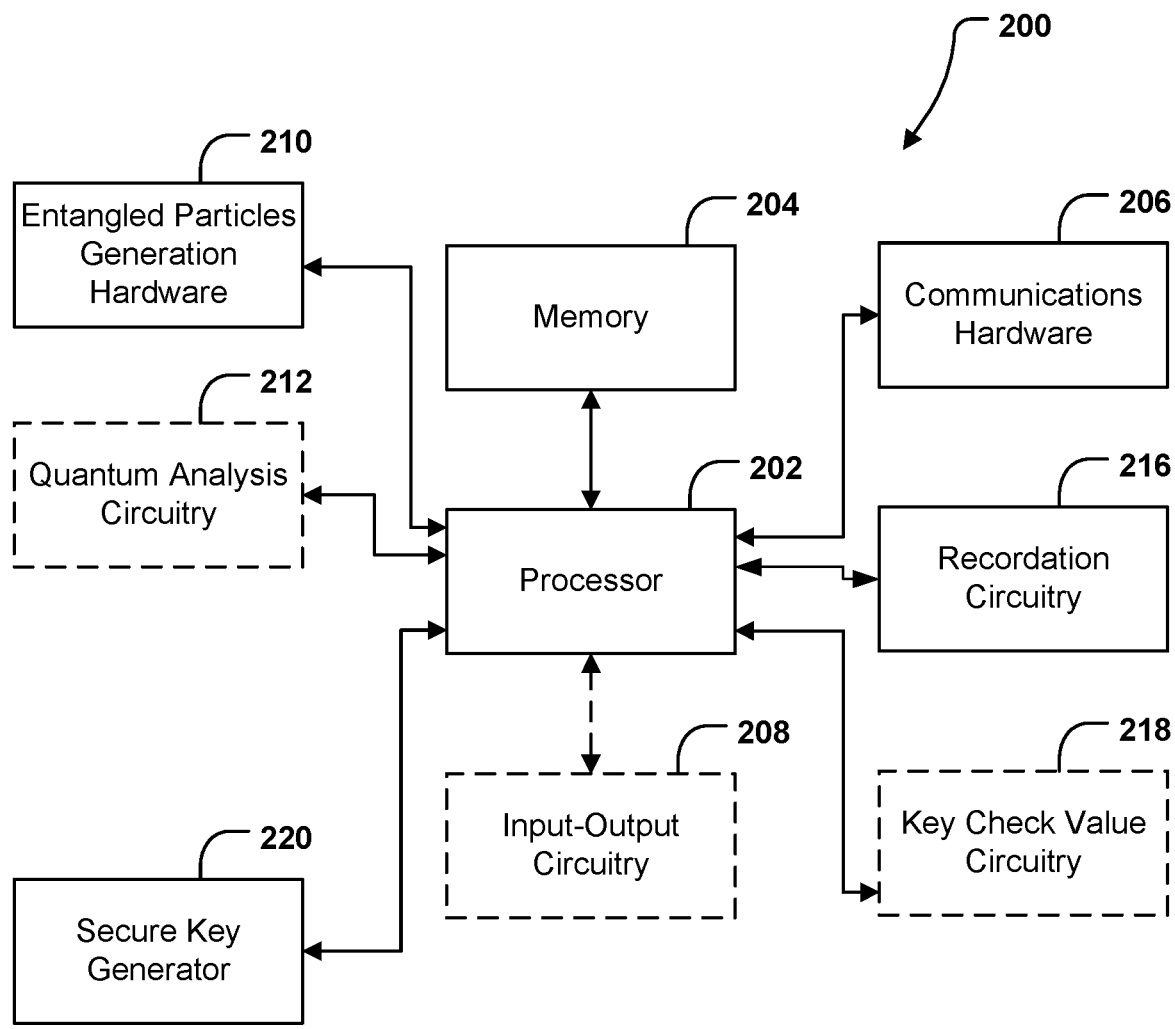
FIG. 2A illustrates a schematic block diagram of example circuitry embodying a device that may perform various operations in accordance with some example embodiments described herein.

The MQKD device 102 (described previously with reference to FIG. 1) may be embodied by one or more computing devices, shown as apparatus 200 in FIG. 2A. As illustrated in FIG. 2A, the apparatus 200 may include processor 202, memory 204, communications hardware 206, input-output circuitry 208, entangled particles generation hardware 210, quantum analysis circuitry 212, recordation circuitry 216, key check value circuitry 218, and a secure key generator 220, each of which will be described in greater detail below. While the various components are only illustrated in FIG. 2A as being connected with processor 202, it will be understood that the apparatus 200 may further comprises a bus (not expressly shown in FIG. 2A) for passing information amongst any combination of the various components of the apparatus 200. The apparatus 200 may be configured to execute various operations described above in connection with FIG. 1 and below in connection with FIGS. 4-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means suitable for transmitting entangled particles, such as a device or circuitry embodied in either hardware or a combination of hardware and software that is configured to receive and/or transmit data from/to any other device, circuitry, or module in communication with the apparatus 200 (e.g., first device (s) 110A-110N and/or host devices (112A-112N). In this regard, the communications hardware 206 may include, for example, interfaces for enabling communications with other devices, such as one or more ports (e.g., a laser port, a fiber-optic cable port, and/or the like).

In some embodiments, the communications hardware 206 is designed to inject quantum data (e.g., entangled particle(s) or secure key(s)) into another device (e.g., any of first devices 110A-110N and host devices 112A-112N). The communications hardware 206 may utilize processor 202, memory 204, and other hardware components included in the apparatus 200 to perform these operations, as described in connection with FIGS. 2D and 4-6 below. The communications hardware 206 may further gather data from a variety of sources (e.g., storage device 106, as shown in FIG. 1, entangled particles generation hardware 210, or the like), may utilize input-output circuitry 208 to receive data from a user, and in some embodiments may utilize a transmission medium to inject quantum data into various devices, or otherwise cause transmission of various data.

Figure 2B:
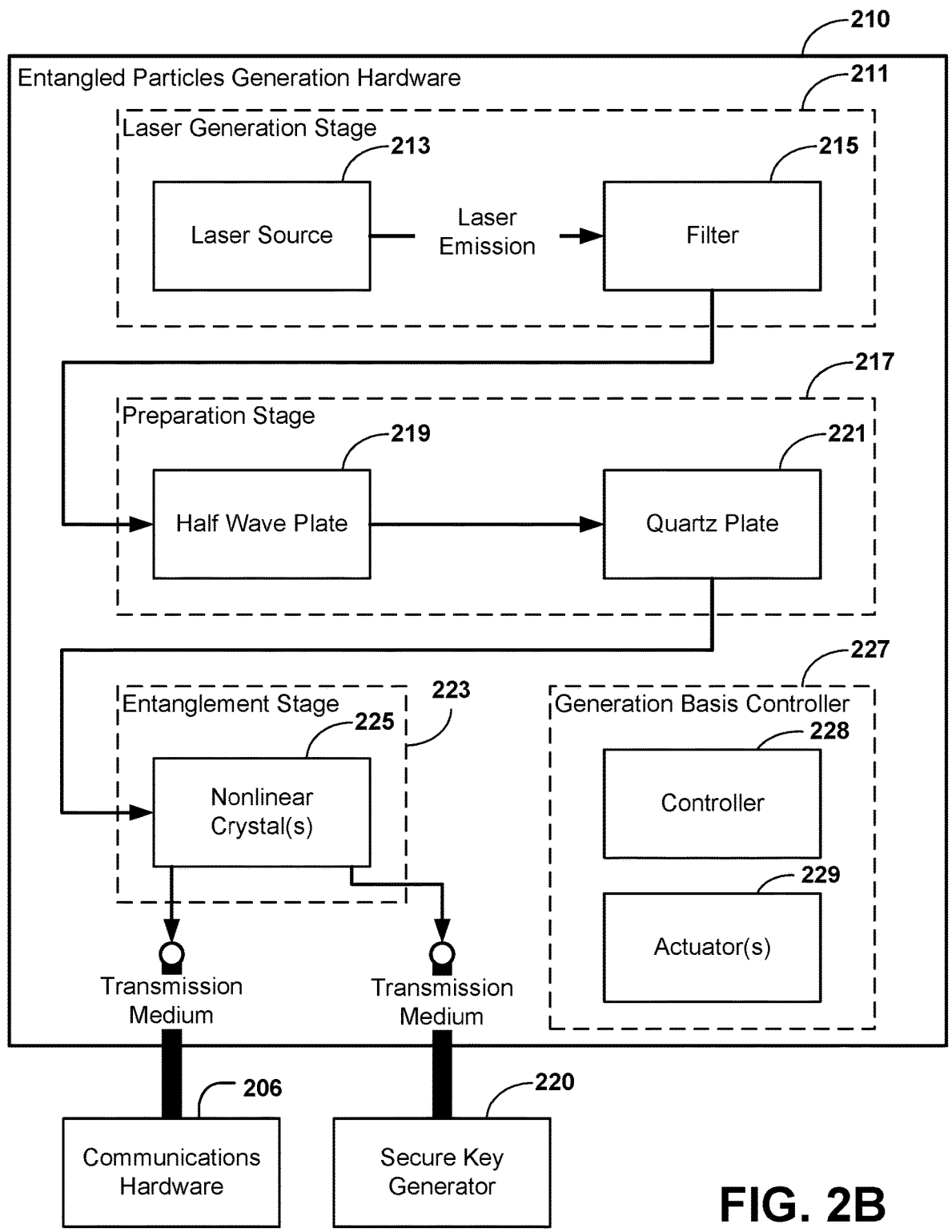
FIG. 2B illustrates a schematic block diagram of example hardware that may perform various operations in accordance with some example embodiments described herein.
Figure 2C:
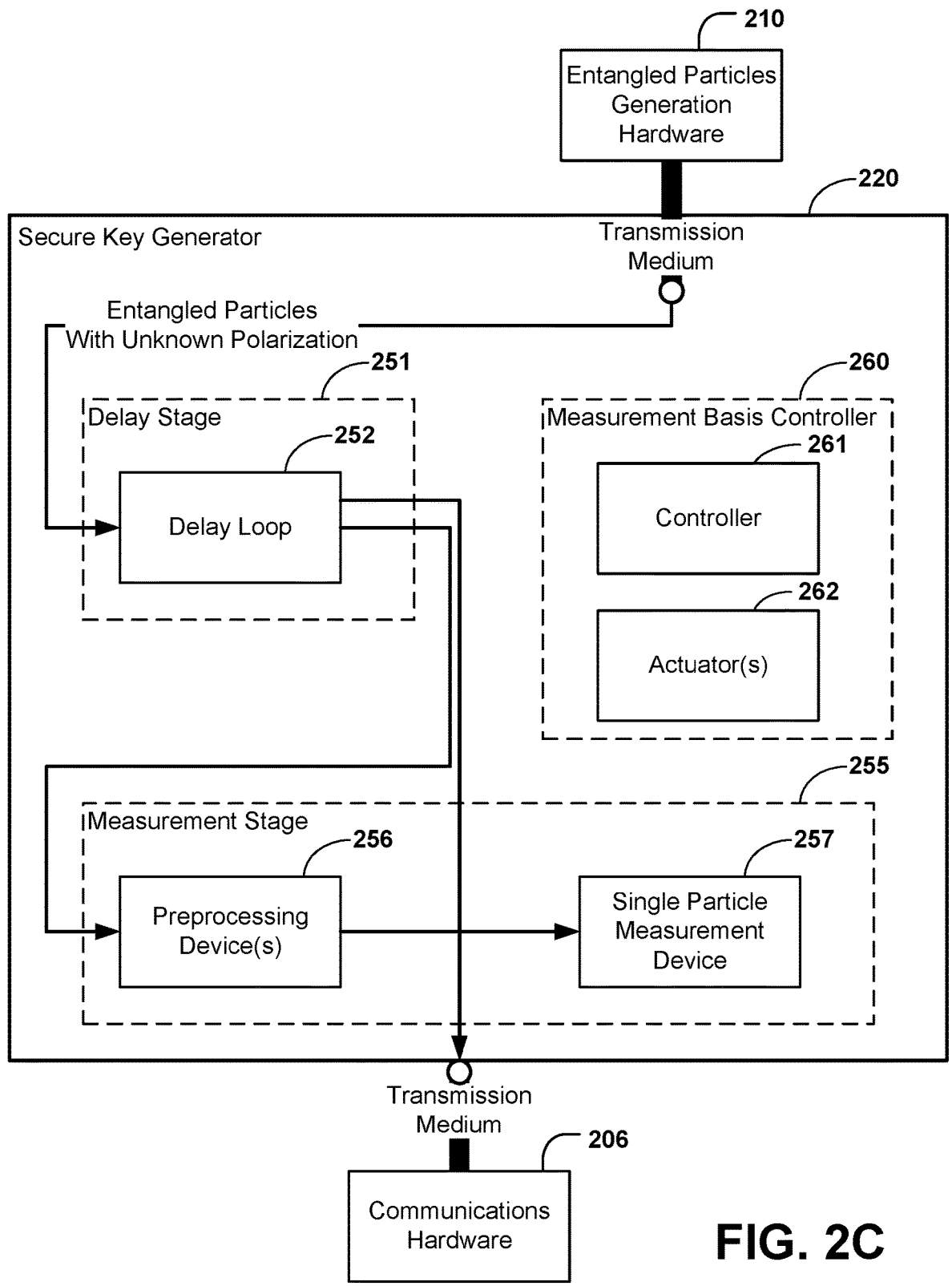
FIG. 2C illustrates a schematic block diagram of example hardware that may perform various operations in accordance with some example embodiments described herein.
Figure 2D:
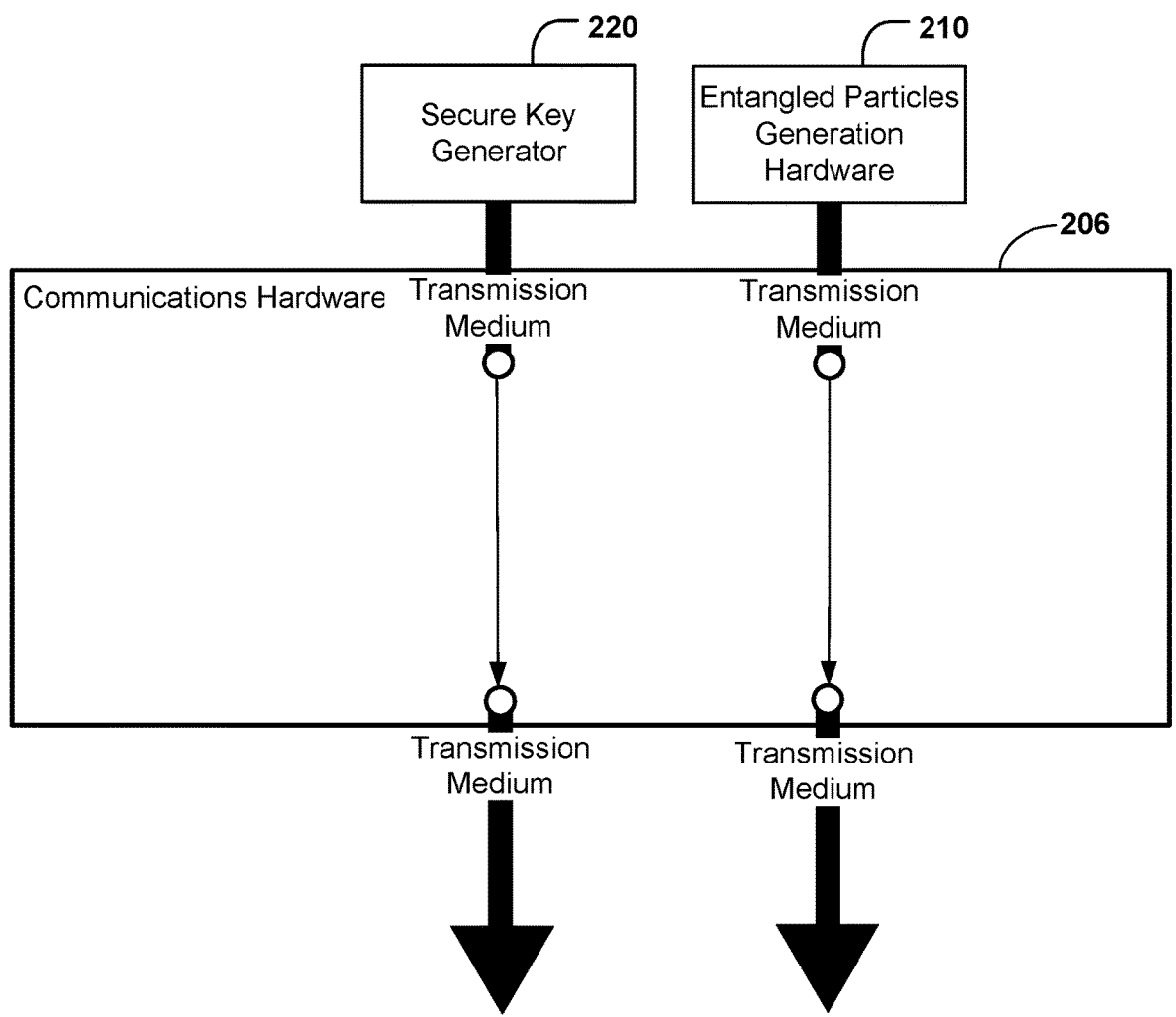
FIG. 2D illustrates a schematic block diagram of example hardware that may perform various operations in accordance with some example embodiments described herein.

Further, communications hardware 206 may include devices for simultaneous transmission of entangled particles from the entangled particles generation hardware 210 and carrier signals on which data (which may include sensitive data, such as metadata relating to the generation of quantum data such as timestamps and/or the like) is encoded on a transmission medium such as an optical fiber, free space, laser, or other medium. Refer to FIG. 2D for additional details regarding communications hardware 206.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a first device 110A-110N and/or host device 112A-112N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises entangled particles generation hardware 210 that generates pairs of entangled particles. The entangled particles generation hardware 210 may utilize processor 202, memory 204, or any other hardware component included in the apparatus 200 to perform these operations, as described in connection with FIGS. 4-6 below. The entangled particles generation hardware 210 may further utilize communications hardware 206 to gather data from a variety of sources (e.g., storage device 106, as shown in FIG. 1), may utilize input-output circuitry 208 to receive data from a user, and in some embodiments may utilize processor 202 and/or memory 204 to generate pairs of entangled particles. Refer to FIG. 2B for additional details regarding entangled particles generation hardware 210.

In addition, the apparatus 200 may further comprise quantum analysis circuitry 212 that determines whether devices are quantum-enabled such that the devices are able to receive and read and/or otherwise process quantum entangled particles. The quantum analysis circuitry 212 may utilize processor 202, memory 204, or any other hardware component included in the apparatus 200 to perform these operations, as described in connection with FIGS. 4-5 below. The quantum analysis circuitry 212 may further utilize communications hardware 206 to gather data from a variety of sources (e.g., first devices 110A-110N, host devices 112A-112N, and/or storage device 106, as shown in FIG. 1), may utilize input-output circuitry 208 to receive data from a user, and in some embodiments may utilize processor 202 and/or memory 204 to determine whether one or more devices are quantum-enabled.

In addition, the apparatus 200 further comprises recordation circuitry 216 that generates log files relating to generation and injection of entangled particles and/or secure keys. The recordation circuitry 216 may utilize processor 202, memory 204, or any other hardware component included in the apparatus 200 to perform these operations, as described in connection with FIGS. 4-6 below. The recordation circuitry 216 may further utilize communications hardware 206 to gather data from a variety of sources (e.g., first devices 110A-110N, host devices 112A-112N, and/or storage device 106, as shown in FIG. 1), may utilize input-output circuitry 208 to receive data from a user, and in some embodiments may utilize processor 202 and/or memory 204 to generate a log file comprising one or more indications of events associated with the generation or injection of entangles particles and/or secure keys.

In addition, the apparatus 200 may further comprise key check value circuitry 218 that compares key check values and determines whether the key check values match. In some embodiments, the key check value circuitry 218 may be configured to generate key check values. The key check value circuitry 218 may utilize processor 202, memory 204, or any other hardware component included in the apparatus 200 to perform these operations, as described in connection with FIGS. 4-6 below. The key check value circuitry 218 may further utilize communications hardware 206 to gather data from a variety of sources (e.g., first devices 110A-110N, host devices 112A-112N, and/or storage device 106, as shown in FIG. 1), may utilize input-output circuitry 208 to receive data from a user, and in some embodiments may utilize processor 202 and/or memory 204 to determine whether a first key check value matches a second key check value.

In addition, the apparatus 200 further comprises a secure key generator 220 that generates a secure key. The secure key generator 220 may utilize processor 202, memory 204, or any other hardware component included in the apparatus 200 to perform these operations, as described in connection with FIGS. 4-6 below. The secure key generator 220 may further utilize communications hardware 206 to gather data from a variety of sources (e.g., storage device 106, as shown in FIG. 1), may utilize input-output circuitry 208 to receive data from a user, and in some embodiments may utilize processor 202 and/or memory 204 to measure entangled particles and generate a secure key based on the measurement of the entangled particles. The secure key generator 220 may be any means such as one or more devices or circuitry embodied in either hardware or a combination of hardware and software that is configured to measure entangled particles and generate secure keys. The entangled particles may be measured to facilitate distribution of true random numbers to devices (thereby each obtaining copies of true random number sequences). The entangled particles may be generated by the entangled particles generation hardware 210 and/or other devices. In some embodiments, the functionality of the secure key generator 220 may be invoked by the quantum analysis circuitry 212 in response to determining that a particular device is not quantum-enabled. Refer to FIG. 2C for additional details regarding secure key generator 220.

Turning to FIG. 2B, a diagram of an example entangled particles generation hardware 210 is illustrated. As noted above, entangled particles generation hardware 210 may provide for the generation of pairs of particles (e.g., photons) that are entangled. Once generated, the entangled particle pairs may be injected into corresponding devices (e.g., a first devices 110A and a corresponding host device 112A). To provide this functionality, entangled particles generation hardware 210 may include a laser generation stage 211, a preparation stage 217, an entanglement stage 223, and a generation basis controller 227. Each of these components is discussed below.

The laser generation stage 211 may be any means such as a device that is configured to generate and/or condition a laser emission. The laser generation stage 211 may include a laser source 213 and a filter 215. The laser source 213 may generate a laser emission (e.g., coherent optical radiation). The laser source 213 may be any type of laser generating device (e.g., a gas laser, chemical laser, excimer laser, solid-state laser, fiber laser, photonic crystal laser, etc.) The filter 215 may be a physical device (e.g., a laser line filter) to optically filter the laser emission selectively for a predetermined frequency. The laser source 213 and filter 215 may be aligned with one another along a transmission path of the laser emission.

The preparation stage 217 may be any means such as a device that is configured to prepare a laser emission for generation of entangled particles. The preparation stage 217 may include a half wave plate 219 and a quartz plate 221. These devices may be positioned along the transmission path of the laser emission to condition the polarization of the laser, remove unwanted spectral components, collimate the laser emission, and/or otherwise prepare the laser emission for impingement on a nonlinear crystal or other structure for entangled photon pair generation.

The entanglement stage 223 may be any means such as a device that is configured to generate entangled photons with a laser emission. In one or more embodiments, the entanglement stage 223 is configured to generate entangled particle pairs having a polarization relationship. However, the entangled particles may have other relationships (e.g., energy, time, etc.). The polarization relationship may require, for example, that each entangled particle of the entangled particle pairs have a same or different polarization with respect to the other entangled particle of the respective entangled particle pairs. When generated, the pairs of entangled particle may be in an indeterminate state (e.g., unmeasured).

The entanglement stage 223 may include one or more nonlinear crystals 225 positioned in the optical path along which the laser emission travels. The non-linear crystals 225 may be configured to induce spontaneous parametric down-conversion of the laser to generate the entangled particle pairs. The entangled particle pairs may have a type II polarization correlation (e.g., a polarization relationship) and may be constrained with known trajectories from the non-linear crystals 225 such that the resulting entangled particles of each pair may be directed along different optical paths. Each of the optical paths may be aligned with respective transmission mediums to direct one of the entangled particles of each entangled particle pair to the communications hardware 206 and, in some embodiments, the other entangled photon of each entangled photon pair to the secure key generator 220, storage device 106, and/or the like. The nonlinear crystals 225 may be formed from any suitable material such as, for example, beta-barium borate, lithium niobate, or other material. The transmission mediums may be, for example, optical fibers, free space, or other structures. The resulting entangled particle pairs may be in an indeterminate polarization state upon generation and the distribution of the resulting polarization states of the entangled particle pairs, once measured, may be truly random by virtue of the generation process.

The generation basis controller 227 may be any means such as a device that is configured to modify the basis used to generate the entangled particle pairs. To appropriately measure the entangled particle pairs, information regarding the generation basis may need to be known. The generation basis controller 227 may include, for example, a controller 228 and one or more actuators 229. The actuators 229 may be positioned to modify the positioning and/or orientation of the half wave plate 219, quartz plate 221, nonlinear crystals 225, and/or transmission mediums with respect to one another. The actuators 229 may be operably connected to the controller 228 such that the controller 228 may operate the actuators 229 to modify the positioning and/or orientation of the aforementioned components.

Turning to FIG. 2C, a diagram of an example secure key generator 220 is illustrated. As noted above, the secure key generator 220 may facilitate measurement of one entangled particle (e.g., photon) of each entangled particle pair generated by the entangled particles generation hardware 210. Measuring one of the entangled particles for each of the entangled particle pairs may produce true random numbers (e.g., a secure key), which can then be provided to a device (e.g., a first device 110A-110N and/or host device 112A-112N). When entangled particles are received by the secure key generator 220, the polarization of the particles may be indeterminate and/or unknown to the apparatus 200. To measure entangled particles, the entangled particles measurement hardware 250 may include a delay stage 251, measurement stage 255, and measurement basis controller 260. Each of these components is discussed below.

The delay stage 251 may be any means such as a device that is configured to delay arrival of entangled particles at a measurement device. The delay may be configured to, for example, prevent entangled particle pairs from being measured by the measurement device (prior to measurement of one entangled particle by another device) or to set a timing of when one entangled particle of an entangled particle pair is measured. The delay stage 251 may include a delay loop 252 (e.g., a string of optical fiber, a free space transmission path bounded with mirrors, etc.). The delay loop may be optically coupled to a transmission medium to receive entangled particles from the entangled particles generation hardware 210. Similarly, the delay loop may be optically coupled to another transmission medium to permit distribution of entangled particles to communications hardware 206 for injection into a device (e.g., any of first devices 110A-110N or host devices 112A-112N).

The measurement stage 255 may be any means such as a device that is configured to measure one entangled particle of entangled particle pairs. The measurement stage 255 may receive the entangled particles delayed by the delay stage 251. The measurement stage 255 may include one or more preprocessing devices 256 and a single particle measurement device 257. Particles received by the measurement stage 255 may be impinged on the preprocessing devices 256. The one or more preprocessing devices 256 may perform any optical function (e.g., filtering, polarizing, polarization filtering, etc.) in preparation for measurement of the particles. In one embodiment, a preprocessing device 256 filters out particles that do not have a particular polarization such that only particles having the particular polarization impinge on the single particle measurement device 257. The single particle measurement device 257 may measure particles that impinge on it. The single particle measurement device 257 may be configured to only measure particles from the one or more preprocessing devices 256. For example, single particle measurement device 257 may be shrouded and/or optically coupled to the one or more preprocessing devices 256. Consequently, the single particle measurement device 257 may only count particles that have the particular polarization. The single particle measurement device 257 may be implemented using single-particle detectors such as, for example, biased semiconductor junctions, superconducting wires, nanowires, and/or other types of devices.

Entangled particles may be generated by the entangled particles generation hardware 210 at a predetermined rate. The aforementioned rate may be used to determine, for different points in time, the value of bits of a bit sequence corresponding to the different points in time. For example, detection of a particle by the single particle measurement device 257 during a period of time (e.g., when a particle of an entangled particle pair is expected to arrive at the single particle measurement device) may be treated as the value of a bit being a "1" whereas not detecting a particle during the period of time may be treated as the value of the bit being a "0". Thus, the combination of preprocessing devices and single particle measurement device may provide for counting of photons having a particular polarization and not counting particles having other polarizations.

The measurement basis controller 260 may be any means such as a device that is configured to modify the basis used to measure particles. To appropriately measure pairs of entangled particles, information regarding the generation basis may need to be known. For example, the launch angle along a transmission medium may need to be known to set a corresponding measurement angle from the transmission medium. If not properly set, the particles may not be detectable. The measurement basis controller 260 may include, for example, a controller 261 and one or more actuators 262. The actuators 262 may be positioned to modify the positioning and/or orientation of the preprocessing devices 256 and/or transmission mediums with respect to one another. The actuators 262 may be operably connected to the controller 261 such that the controller 261 may operate the actuators 262 to modify the positioning and/or orientation of the aforementioned components. Information regarding the generation and measurement basis may be stored, for example, in the storage device 106. Similar information may be stored in corresponding participating device repositories.

Turning to FIG. 2D, a diagram of example communications hardware 206 is illustrated. The communications hardware 206 may facilitate communications between apparatus 200 and other devices and distribution of an entangled particle of an entangled particle pair and/or secure key(s) to other devices (e.g. first devices 110A-110N and/or host devices 112A-112N). As one example, the communications hardware may comprise a fiber-optic cable that facilitates distribution of quantum data to other devices. In such embodiments, the fiber-optic cable may connect to another device in order to transmit quantum data between the devices. In some such embodiments, the fiber-optic cable may be a retractable fiber-optic cable to improve the convenience of transporting the MQKD device 102 when not connective to another device. As another example, the communications hardware may include a laser port that facilitates distribution of the quantum data. In this regard, in some embodiments, the MQKD device 102 may also include a mechanism for assisting with an alignment of the laser port of the MQKD device 102 with a corresponding laser port of a first device 110A-110N or host device 112A-112N. Other implementations of the communications hardware 206 may utilize still other componentry suitable for delivering quantum data from the MQKD device 102 to another device. In some embodiments, multiple connection modalities may be included in the MQKD device 102 to permit greater interoperability with a variety of devices.

Although components 202-220 are described in part using functional language, it will be understood that the particular implementations necessarily include the use of particular hardware. It should also be understood that certain of these components 202-220 may include similar or common hardware. For example, the entangled particles generation hardware 210, quantum analysis circuitry 212, recordation circuitry 216, key check value circuitry 218, and secure key generator 220 may each at times leverage use of the processor 202, memory 204, communications hardware 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," "generator," "injector," and "engine" with respect to elements of the apparatus therefore shall be interpreted as necessarily including the particular hardware configured to perform the functions associated with the particular element being described. Of course, while the terms "circuitry," "generator," "injector," and "engine" should be understood broadly to include hardware, in some embodiments, the terms "circuitry," "generator," "injector," and "engine" may in addition refer to software instructions that configure the hardware components of the apparatus 200 to perform the various functions described herein.

Although the entangled particles generation hardware 210, quantum analysis circuitry 212, recordation circuitry 216, key check value circuitry 218, and secure key generator 220 may leverage processor 202, memory 204, communications hardware 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications hardware 206 or input-output circuitry 208 for enabling any functions not performed by special-purpose hardware elements. In all embodiments, however, it will be understood that the entangled particles generation hardware 210, quantum analysis circuitry 212, recordation circuitry 216, key check value circuitry 218, and secure key generator 220 are implemented via particular machinery designed for performing the functions described herein in connection with such elements of apparatus 200.

Figure 3:
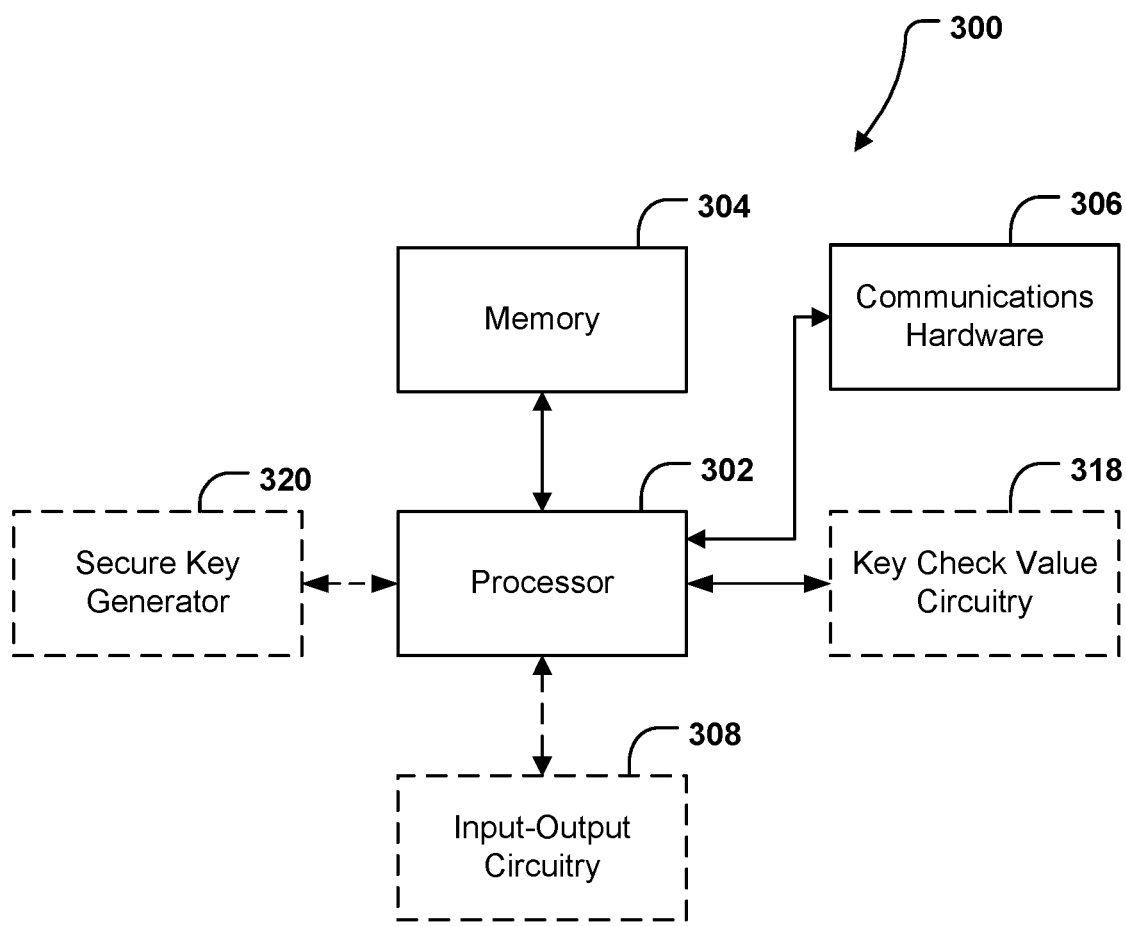
FIG. 3 illustrates a schematic block diagram of example hardware that may perform various operations in accordance with some example embodiments described herein.

As illustrated in FIG. 3, an apparatus 300 is shown that represents an example first device (e.g., any of first devices 110A-110N) or an example host device (e.g., any of host devices 112A-112N). The apparatus 300 includes processor 302, memory 304, communications hardware 306, and key check value circuitry 318, and may optionally include input-output circuitry 308, and secure key generator 320 (e.g., in instances in which the device that embodies apparatus 300 is quantum-enabled), each of which is configured to be similar to the similarly named components described above in connection with FIG. 2.

In some embodiments, various components of the apparatus 300 may be hosted remotely (e.g., by one or more cloud servers) and thus need not physically reside on the corresponding apparatus 300. Thus, some or all of the functionality described herein may be provided by third party circuitry. For example, apparatus 300 may access one or more third party circuitries via any sort of networked connection that facilitates transmission of data and electronic information between the apparatus 300 and the third party circuitries. In turn, that apparatus 300 may be in remote communication with one or more of the other components described above as comprising the apparatus 300.

As will be appreciated based on this disclosure, example embodiments contemplated herein may be implemented by an apparatus 200 configured to engage with a variety of apparatuses 300. Furthermore, some example embodiments may utilize one or more computer program product comprising software instructions stored on at least one non-transitory computer-readable storage medium (e.g., memory 204 or 304) that, when executed, cause execution of the functionality of various components of a respective apparatus 200 or 300. Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2A or apparatus 300 as described in FIG. 3 that loading the software instructions onto a computing device or apparatus produces a special-purpose machine comprising the means for implementing any corresponding functions described herein.

Having described specific components of example apparatuses 200 and 300, example embodiments are described below in connection with a series of flowcharts.

Example Operations

Figure 4:
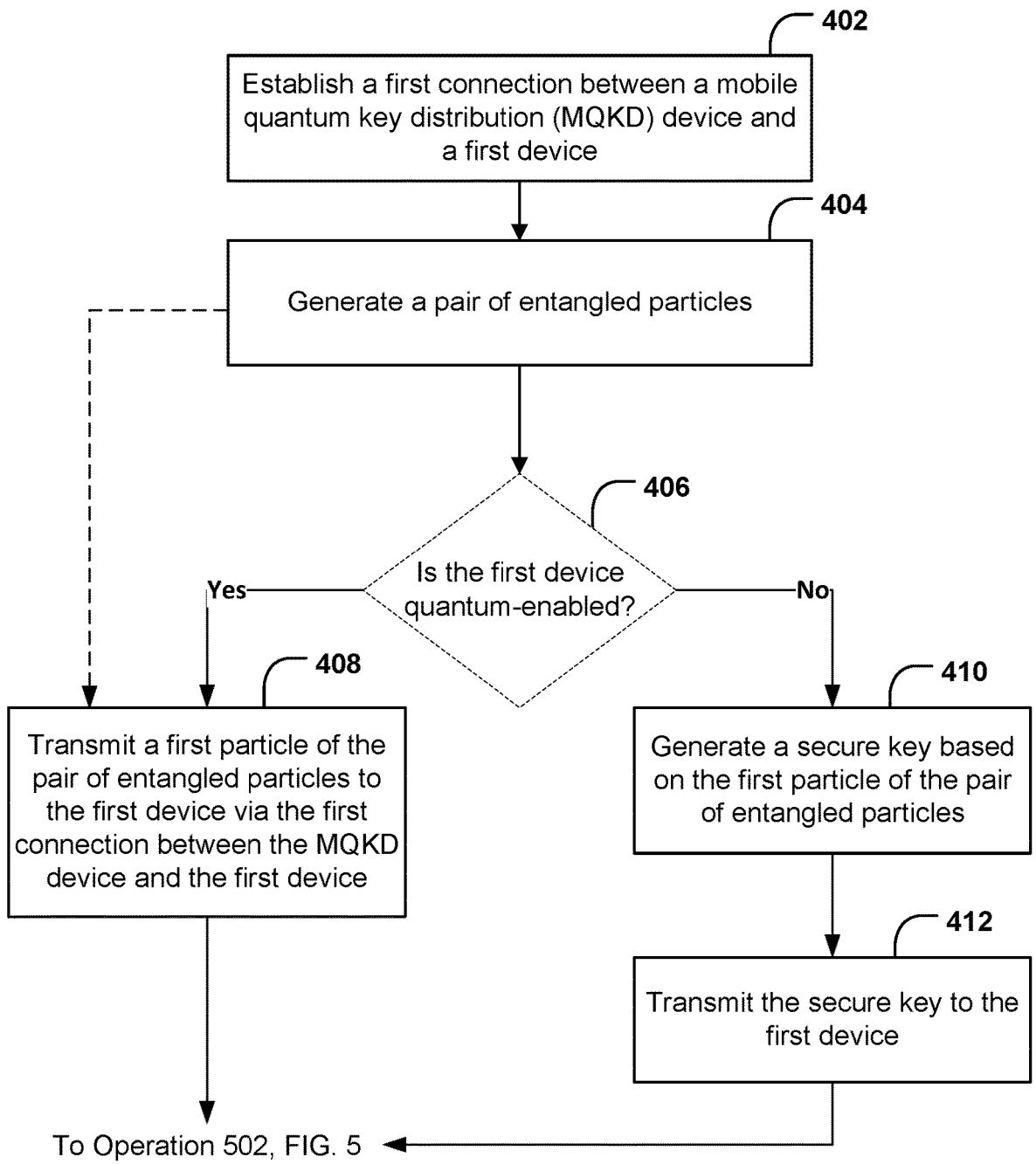
FIG. 4 illustrates an example flowchart for mobile quantum key distribution, in accordance with some example embodiments described herein.
Figure 5:
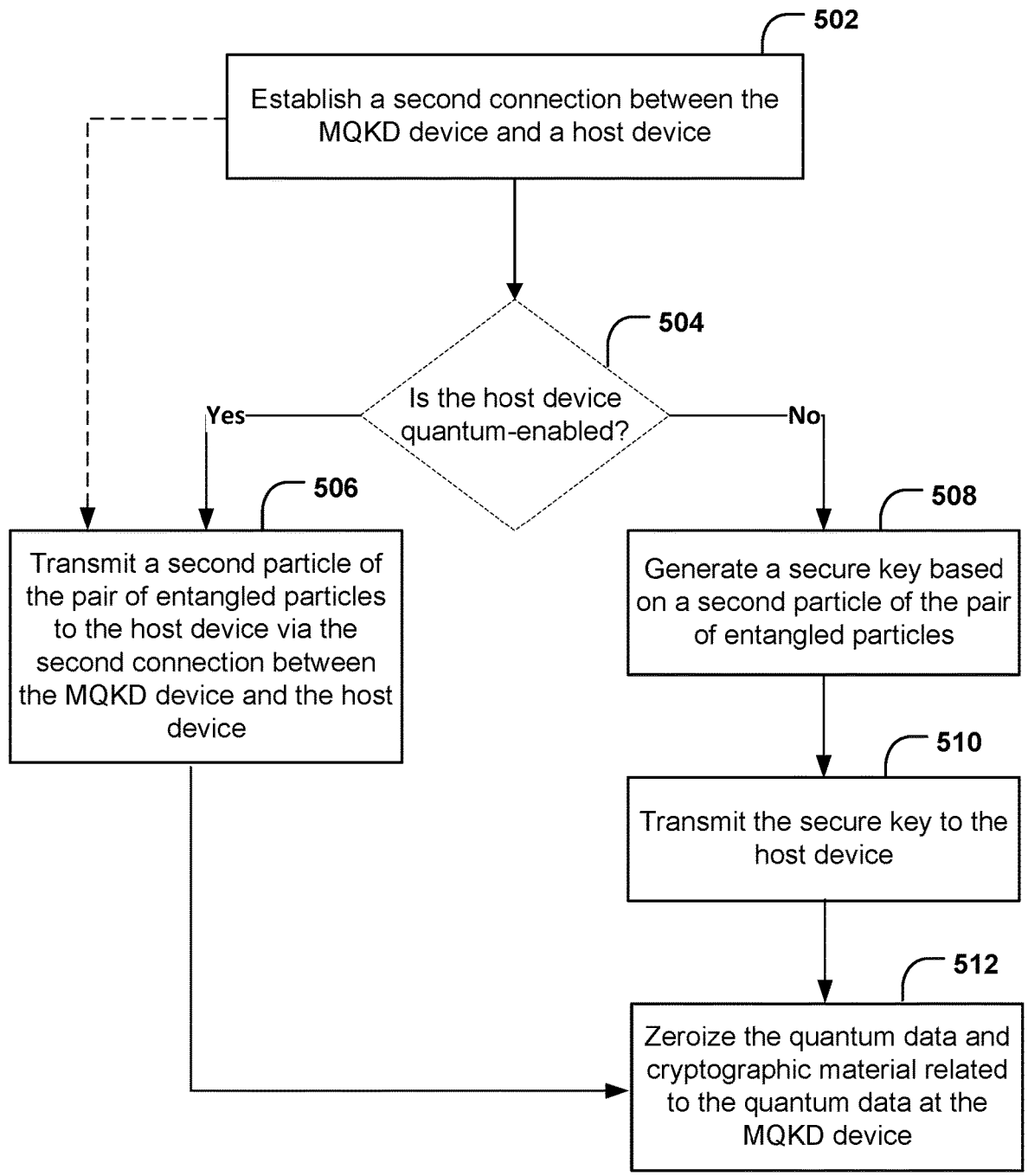
FIG. 5 illustrates an example flowchart for mobile quantum key distribution, in accordance with some example embodiments described herein.
Figure 6:
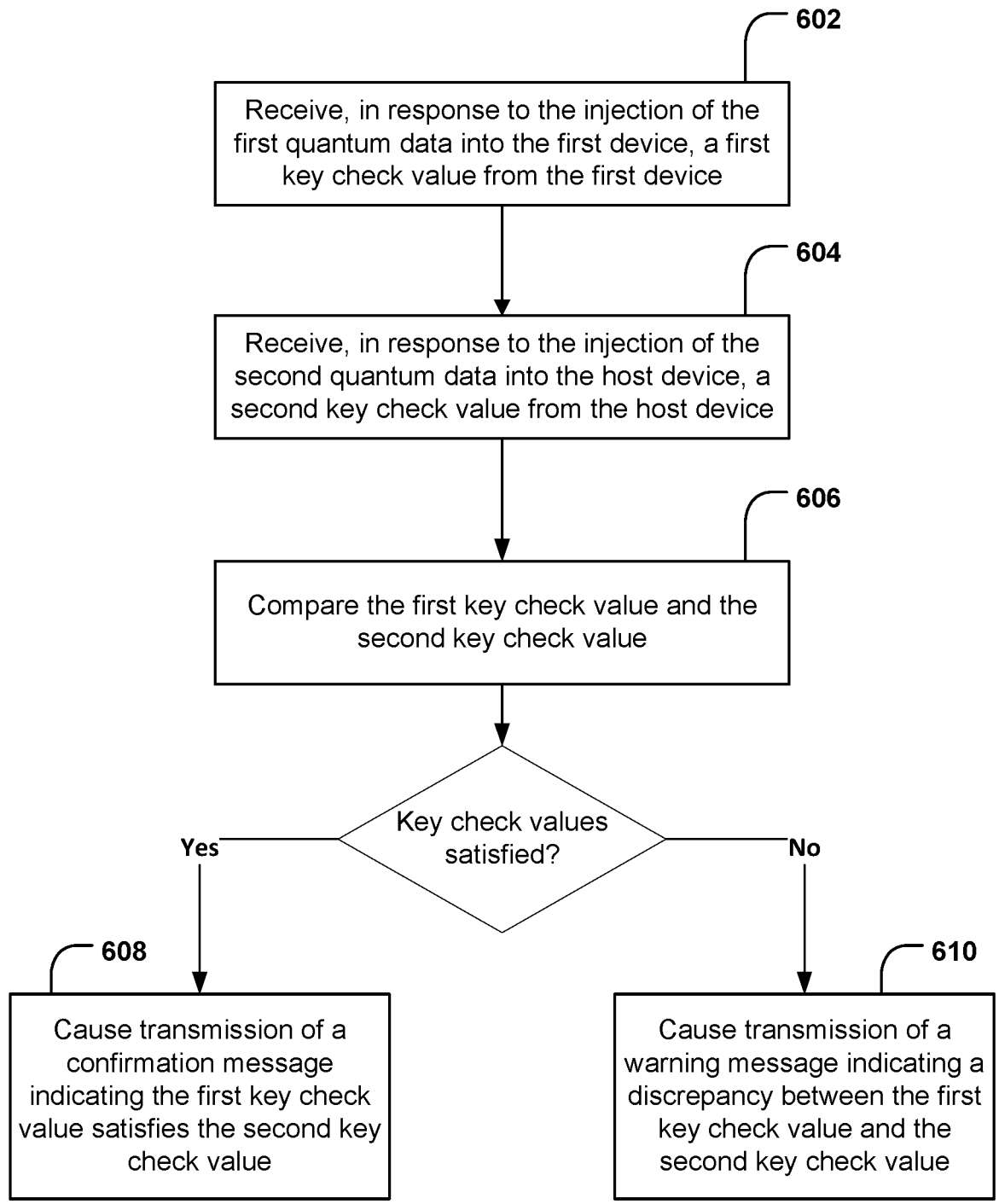
FIG. 6 illustrates another example flowchart for key check value match determination, in accordance with some example embodiments described herein.

Turning to FIGS. 4-6, example flowcharts are illustrated that contain example operations implemented by example embodiments described herein. The operations illustrated in FIGS. 4-6 may, for example, be performed by the MQKD device 102 shown in FIG. 1, which may in turn be embodied by an apparatus 200, which is shown and described in connection with FIG. 2A. To perform the operations described below, the apparatus 200 may utilize one or more of processor 202, memory 204, communications hardware 206, input-output circuitry 208, entangled particles generation hardware 210, quantum analysis circuitry 212, recordation circuitry 216, key check value circuitry 218, secure key generator 220, and/or any combination thereof.

In some embodiments, during operation of the MQKD device, recordation circuitry 216 may be utilized in order to create a log of events performed at or by the MQKD device. In this regard, the MQKD device 102 includes means, such as processor 202, memory 204, recordation circuitry 216, and/or the like, for generating a log file. The log file may relate to the injection of the first quantum data (e.g., the first particle and/or secure key based on the first particle) into the first device and the injection of the second quantum data (e.g., the second particle and/or secure key based on the second particle) into the host device.

In some embodiments, the log file may comprise an indication of a date, time, or location of one or more events, such as the generation or injection of the first and second quantum data. Said differently, each time an event occurs, such as, for example, generating a pair of entangled particles, injecting particles into a device, generating a secure key, injecting the secure key into a device, and/or zeroizing quantum data as further described below, the event may be recorded to a log file in order to keep record of the events. The log file may include, for example, a description of the event (e.g., generation of entangled particles), a time the event occurred, a date the event occurred, a location (e.g., GPS coordinates) where the event occurred, and/or other details regarding the event.

Turning first to FIG. 4, example operations are shown for mobile quantum key distribution.

As shown by operation 402, the MQKD device 102 (e.g., apparatus 200) includes means, such as processor 202, memory 204, communications hardware 206, and/or the like, for establishing a first connection with a first device, which may comprise an apparatus 300, as previously introduced. For example, the MQKD device may be transported (e.g., by a human, drone, and/or other entity) to the first device and connected to the first device. The first device may be any type of device. For example, the first device may be a stationary device, such as an ATM, POS terminal, and/or other stationary device. In some embodiments, a connection between the MQKD device 102 and the first device may be established using communications hardware 206 interacting with corresponding communications hardware 306 of the first device. For example, the connection may be a physical connection, such as via a fiber-optic cable. As another example, the connection may be a laser connection. In some embodiments, in response to establishing the connection, the MQKD device (e.g., via recordation circuitry 216) may record data regarding the connection establishment (e.g., a location, time, description, and/or the like) to a log file.

As shown by operation 404, the MQKD device 102 includes means, such as processor 202, memory 204, entangled particles generation hardware 210, and/or the like, for generating a pair of entangled particles. To simplify explanation, reference is made to generation of a pair of entangled particles. However, it should be appreciated that the entangled particles generation hardware 210 may be utilized to generate a stream of entangled particles (e.g., a plurality of pairs of entangled particles). In some embodiments, the entangled particles generation hardware 210 of the MQKD device is utilized to generate the pair of entangled particles (e.g., as described above with reference to FIG. 2B). The entangled particles generation hardware 210 may generate the entangled particles either after the first connection is established, although in some embodiments the entangled particles generation hardware 210 may generate the entangled particles prior to even establishing the first connection. In some embodiments, in response to generating the entangled particles, the MQKD device (e.g., via recordation circuitry 216) may record data regarding the generation (e.g., a location, time, description, and/or the like) to the log file.

In some embodiments, the MQKD device 102 may comprise quantum analysis circuitry 212 which can be used to determine whether a device which the MQKD device is connected to is quantum-enabled. In this regard, a check may be performed prior to attempting an injection of particles into the device. Optional operation 406 illustrates that, in such embodiments, the MQKD device 102 may include means, such as processor 202, memory 204, quantum analysis circuitry 212, and/or the like, for determining whether the first device is quantum-enabled. In this regard, the quantum analysis circuitry 212 may be utilized to determine whether the device is capable of receiving, reading, and/or otherwise processing quantum entangled particles.

In some embodiments, the quantum analysis circuitry 212 and the determination as to whether the device is quantum-enabled may not be necessary, and it may be assumed that the device (or any device) in connection with the apparatus 200 is quantum-enabled. Regardless of whether a determination is made that the first device is quantum-enabled or the procedure skips operation 406 entirely, the method may then continue to operation 408, wherein, as shown in FIG. 4, the MQKD device 102 includes means, such as processor 202, memory 204, communications hardware 206, and/or the like, for transmitting a first particle of the pair of entangled particles to the first device via the first connection between the apparatus 200 and the first device. The second particle of the pair of entangled particles may correspondingly be retained within the MQKD device (e.g., through its transmission into a delay stage 251 of secure key generator 220) for subsequent delivery to a host device, as described below in connection with FIG. 5.

Again, while discussed for ease of description in terms of a single pair of entangled parties, various embodiments may utilize multiple pairs of entangled particles, such that for each pair of entangled particles generated (e.g., in operation 404), a first particle of a respective pair of entangled particles is injected into the first device. In this fashion, an arbitrarily long sequence of entangled particles may be injected into the first device, wherein the length of the sequence may be selected based on the desired size of a secure key to be used. In some embodiments, in response to transmitting the entangled particles, the MQKD device (e.g., via recordation circuitry 216) may record data regarding the transmission (e.g., a location, time, description, and/or the like) to the log file.

In some embodiments, in response to determining that the first device is not quantum-enabled, the method continues to operation 410, wherein the MQKD device 102 includes means, such as processor 202, memory 204, secure key generator 220, and/or the like, for generating a secure key based on the first particle of the pair of entangled particles. Said differently, rather than injecting particles directly into the first device, a secure key is first created using a first particle from each of the entangled pairs of particles generated in operation 404 (e.g., as described above with reference to FIG. 2C), and then that secure key may be injected into the first device.

The secure key may be generated by measuring the first particle (e.g., using quantum key generator 220) to establish a value for the first particle. Based on the desired size of the secure key, additional entangled particles may also be measured to establish a value for the secure key. In some embodiments, in response to generating the secure key, the MQKD device (e.g., via recordation circuitry 216) may record data regarding the generation (e.g., a location, time, description, and/or the like) to the log file.

The secure key, once generated, may then be injected into the first device. As shown by operation 412, the MQKD device 102 includes means, such as processor 202, memory 204, communications hardware 206, and/or the like, for transmitting the secure key to the first device. Where a secure key (rather than an entangled particle) is transmitted to the first device, a wider variety of transmission techniques may be suitable. In some embodiments, in response to transmitting the secure key to the first device, the MQKD device (e.g., via recordation circuitry 216) may record data regarding the transmission (e.g., a location, time, description, and/or the like) to the log file.

In performing the operations described above, the MQKD device 102 interfaces with an apparatus 300 that is embodied by the first device. This apparatus 300 includes means, such as processor 302, memory 304, communications hardware 306, and/or the like, for receiving the quantum data from the apparatus 200. As described above, in instances in which the first device is quantum-enabled, the first device may receive a first particle of a pair of entangled particles generated by the MQKD device. In instances in which the first device is not quantum-enabled, the quantum data received from the MQKD device comprises a secure key generated by the MQKD device.

The apparatus 300 also includes means, such as processor 302, memory 304, communications hardware 306, input-output circuitry 308, key check value circuitry 318, secure key generator 320, and/or the like, for processing the quantum data to facilitate secure communication between the first device and a second device (e.g., a host device).

For example, the first device may process the received quantum data to generate a secure key, such that secure communication with another device (e.g., a host device) is facilitated using the secure key. In this regard, the apparatus 300 includes means, such as processor 302, memory 304, secure key generator 320, and/or the like, for generating a secure key based on the quantum data. For example, the first device may utilize the secure key generator 320 to measure the first particle of the pair of entangled particles received from the MQKD device in order to generate the secure key. In another embodiment, as described above, the first device may instead receive the secure key directly from the MQKD device (e.g., if the first device is not quantum-enabled).

Once the quantum data (e.g., the first particle or, alternatively, a secure key generated based on the first particle) is injected into the first device, the method continues to operation 502 of FIG. 5.

As shown by operation 502, the MQKD device 102 includes means, such as processor 202, memory 204, communications hardware 206, and/or the like, for establishing a second connection between the MQKD device and a host device.

For example, after the injection of the quantum data at a first device as described above, the MQKD device may then be disconnected from the first device and transported (e.g., over a distance) to a host device and connected to the host device. The host device may be any type of device requiring a secure connection and/or means of communication with the first device. In some embodiments, a connection between the MQKD device and the host device may be established using communications hardware 206 and/or 306. For example, similar to the connection of the MQKD and the first device, the connection may be a physical connection, such as via a fiber-optic cable. As another example, the connection may be a laser connection. In some embodiments, in response to establishing the connection, the MQKD device (e.g., via recordation circuitry 216) may record data regarding the connection establishment (e.g., a location, time, description, and/or the like) to a log file.

In some embodiments, as described above, an optional check may be performed to determine whether a device connected to the MQKD device is quantum-enabled. In this regard, as shown by optional operation 504, the MQKD device 102 may include means, such as processor 202, memory 204, quantum analysis circuitry 212, and/or the like, for determining whether the host device is quantum-enabled. In this regard, the quantum analysis circuitry 212 may be utilized to determine whether the host device is capable of receiving, measuring, and/or otherwise processing quantum entangled particles.

If the host device is quantum-enabled, the method then continues to operation 506, wherein the MQKD device 102 includes means, such as processor 202, memory 204, communications hardware 206, and/or the like, for transmitting a second particle of the pair of entangled particles to the host device via the second connection between the MQKD device and the host device. In this regard, while the first device received the first particle of the pair of entangled particles, the MQKD device 102 thereafter retained the second particle of the pair of entangled particles in a delay stage 251 of secure key generator 220 while the MQKD device 102 remained in transit. Upon connection to the host device, the secure key generator 220 thereafter releases the second particle from the delay stage 251 and prompts its delivery, via communications hardware 206, to the host device. By injecting both the first device and the host device with respective particles entangled with each other, the MQKD device provides those two devices with the ability to measure the state of the entangled particles and generate a secure key that is unknown to any devices between those two devices. That secure key, in turn, may be used for any purpose, such as to facilitate secure communication between the host device and the first device. In some embodiments, in response to transmitting the entangled particles, the MQKD device (e.g., via recordation circuitry 216) may record data regarding the transmission (e.g., a location, time, description, and/or the like) to the log file.

Alternatively, in accordance with a determination that the host device is not quantum-enabled, the method continues to operation 508, wherein the MQKD device 102 includes means, such as processor 202, memory 204, secure key generator 220, and/or the like, for generating a secure key based on the second particle of the pair of entangled particles. The secure key may be generated by measuring the second particle (e.g., using quantum key generator 220) to establish a value for the second particle. In this regard, a secure key created using a second particle from each of the entangled pairs of particles (e.g., the particles in the MQKD device which were not injected into the first device). In some embodiments, in response to generating the secure key, the MQKD device (e.g., via recordation circuitry 216) may record data regarding the generation (e.g., a location, time, description, and/or the like) to the log file.

The secure key, once generated, may then be injected into the host device. As shown by operation 510, the MQKD device 102 includes means, such as processor 202, memory 204, communications hardware 206, and/or the like, for transmitting the secure key to the host device. In some embodiments, in response to transmitting the secure key, the MQKD device (e.g., via recordation circuitry 216) may record data regarding the transmission (e.g., a location, time, description, and/or the like) to the log file.

By injecting both the first device and the host device with respective secure keys generated based on respective particles of the pair of entangled particles, the MQKD device facilitates secure communication between the host device and the first device based at least on the pair of entangled particles. Further, as detailed above, the MQKD device provides for the ability to not only generate and inject entangled particles, but also, if a device is encountered that is not quantum-enabled, measure the entangled particles to first generate a secure key to instantly provide to the device.

In this regard, the apparatus 300 (e.g., when embodied by the host device) includes means, such as processor 302, memory 304, communications hardware 306, and/or the like, for receiving quantum data from a MQKD device. As described above, in instances in which the host device is quantum-enabled, the host device may receive a first particle of a pair of entangled particles generated by the MQKD device. In instances in which the host device is not quantum-enabled, the quantum data received from the MQKD device comprises a secure key generated by the MQKD device.

The apparatus 300 (e.g., when embodied by the host device) also includes means, such as processor 302, memory 304, communications hardware 306, input-output circuitry 308, key check value circuitry 318, secure key generator 320, and/or the like, for processing the quantum data to facilitate secure communication between the host device and a second device (e.g., the first device).

For example, the host device may process the received quantum data to generate a secure key itself, such that secure communication with another device is facilitated using the secure key. In this regard, the apparatus 300 includes means, such as processor 302, memory 304, secure key generator 320, and/or the like, for generating a secure key based on the quantum data. For example, the host device may utilize the secure key generator 320 to measure the second particle of the pair of entangled particles received from the MQKD device in order to generate the secure key. In another embodiment, as described above, the host device may instead receive the secure key from the MQKD device (e.g., if the host device is not quantum-enabled).

In some embodiments, once the quantum data is injected into both the first device and the host device, the MQKD device may zeroize the quantum data stored on the MQKD device for security purposes. In this regard, as shown by operation 512, the MQKD device 102 includes means, such as processor 202, memory 204, secure key generator 220, and/or the like, for zeroizing the quantum data and cryptographic material related to the quantum data. For example, the MQKD device may alter (e.g., overwriting the quantum data with zeroes) or delete the quantum data to prevent disclosure and/or recovery of the quantum data if the MQKD device were to be stolen or otherwise captured. In some embodiments, zeroizing the quantum data may include zeroizing any cryptographic material related to the quantum data on the MQKD device, including both particles (e.g., untangled particles having been measured to generate a secure key) and the secure key. Zeroization of the quantum data may, in some embodiments, be automatically performed in response to injection of the quantum data into the first device and host device. As one example, a generated log file (as described above) may be accessed and analyzed to determine if the quantum data has been injected into all necessary devices, and if so, the MQKD device may automatically zeroize the quantum data stored on the MQKD device. Zeroization of the quantum data may, in some embodiments, be performed in response to a zeroization request received via input-output circuitry 208 of the MQKD device. For example, personnel handling the MQKD device may initiate the zeroization of the quantum data via a user interface at the MQKD device. In this regard, the MQKD device 102 may include means, such as processor 202, memory 204, input-output circuitry 208, and/or the like, for receiving a zeroization request. In response to the zeroization request, the MQKD device may automatically zeroize the quantum data.

In some embodiments, the apparatus 200 includes means, such as processor 202, memory 204, communications hardware 206, and/or the like, for causing transmission of the log file. For example, the log file may be transmitted to another device (e.g., via communications network 108) for viewing by one or more users for verification of a timeline of events associated with the MQKD device and/or other validation purposes. For example, in some embodiments, the log file may be transmitted to the host device along with the quantum data.

Use of Key Check Values

In some embodiments, the MQKD device, first device, and host device may utilize key check values (KCV) in order to verify accuracy of data transmitted between various devices. A KCV is a non-secret value that is cryptographically derived from a secure key and is used to verify that the underlying value is as expected. For example, once the quantum data is received at the first device from the MQKD device as described above, the first device may provide a key check value that is based on the quantum data to the MQKD device. In some embodiments, the key check value may represent data associated with the quantum data itself. For example, the first device may measure the first particle of the pair of entangled particles to generate a secure key, and subsequently generate a key check value based on the secure key. In other embodiments, the key check value may be metadata relating to the reception of the quantum data. For example, the metadata may include a timestamp (e.g., a time and/or date which the quantum data was received), an identifier or credential associated with the first device, and/or other values or information that provide proof that the first device is the device that received the quantum data and/or the correct device to have received the quantum data.

In this regard, the apparatus 300 (e.g., when embodied by the first device) includes means, such as processor 302, memory 304, key check value circuitry 318, and/or the like, for generating a key check value based on the quantum data. The apparatus 300 also includes means, such as processor 302, memory 304, communications hardware 306, and/or the like, for causing transmission of the key check value (e.g., to the MQKD device via an interface between communications hardware 306 of the apparatus 300 and communications hardware 206 of an apparatus 200 comprising the MQKD device).

Turning to FIG. 6, an example method for key check value match determination is shown.

As shown by operation 602, the MQKD device 102 includes means, such as processor 202, memory 204, communications hardware 206, and/or the like, for receiving, in response to the injection of the first quantum data into the first device, a first key check value from the first device. In this regard, once the first particle is injected (e.g., as described above in connection with operation 408 of FIG. 4) or a secure key is injected (e.g., as described above in connection with operation 412 of FIG. 4) into the first device, the first device may generate a key check value based on the received quantum data (e.g., the received entangled particle or secure key) as described above and transmit the key check value back to the MQKD device. In some embodiments, in response to receiving the key check value from the first device, the MQKD device (e.g., via recordation circuitry 216) may record data regarding the reception of the key check value (e.g., a location, time, description, and/or the like) to the log file.

As shown by operation 604, the MQKD device 102 includes means, such as processor 202, memory 204, communications hardware 206, and/or the like, for receiving, in response to the injection of the second quantum data into the host device, a second key check value from the host device. Similarly, once the second particle is injected (e.g., as described above in connection with operation 506 of FIG. 5) or a secure key is injected (e.g., as described above in connection with operation 510 of FIG. 5) into the host device, the host device may also generate a key check value based on the received second particle or secure key and transmit the key check value back to the MQKD device. In this regard, the apparatus 300 (e.g., when embodied by the host device) includes means, such as processor 302, memory 304, key check value circuitry 318, and/or the like, for generating a key check value based on the quantum data. The apparatus 300 also includes means, such as processor 302, memory 304, communications hardware 306, and/or the like, for causing transmission of the key check value (e.g., to the MQKD device). In some embodiments, in response to receiving the key check value from the host device, the MQKD device (e.g., via recordation circuitry 216) may record data regarding the reception of the key check value (e.g., a location, time, description, and/or the like) to the log file.

As shown by operation 606, the MQKD device 102 includes means, such as processor 202, memory 204, key check value circuitry 218, and/or the like, for comparing the first key check value and the second key check value. For example, the comparison may be performed to determine whether the first key check value satisfies the second key check value. For example, it may be determined that a timestamp associated with the first key check value is within a time range that is logically possible given the second key check value (e.g., the injection of the quantum data to the first device was performed within the same 24-hour period as the injection of the quantum data to the host device, or the injection into the first device was performed before, rather than after, the injection into the host device). In another embodiment, for example, in which the first and second key check values are values based on respective secure keys, the comparison may be performed to determine whether the first key check value matches (e.g., is the same as) the second key check value.

In some embodiments, in response to determining that the first key check value satisfies the second key check value, a confirmation message indicating the first key check value satisfies the second key check value may be transmitted (e.g., for display by MQKD device 102). In this regard, the method continues to operation 608, wherein the apparatus 200 includes means, such as processor 202, memory 204, communications hardware 206, input-output circuitry 208, and/or the like, for causing transmission of a confirmation message indicating the first key check value satisfied the second key check value.

In some embodiments, in response to determining that the first key check value does not satisfy the second key check value, a confirmation message indicating a discrepancy may be transmitted (e.g., for display). In this regard, the method continues to operation 610, wherein the MQKD device 102 includes means, such as processor 202, memory 204, communications hardware 206, and/or the like, for causing transmission of a warning message indicating a discrepancy between the first key check value and the second key check value.

In some embodiments, rather than the MQKD device performing the comparison of the key check values, another device (e.g., a host device or another second device injected with second quantum data) may perform the comparison. Said differently, after receiving a first key check value from a first device in response to injection of the first quantum data, the MQKD device may then transmit the second quantum data, along with the first key check value, to the host device. The host device may then generate a second key check value and compare the first and second key check values to determine whether first key check value satisfies the second key check value. In this regard, the apparatus 300 (e.g., when embodied by the host device or any device receiving second quantum data) includes means, such as processor 302, memory 304, communications hardware 306, and/or the like, for receiving a first key check value from the MQKD device, wherein the first key check value is based on quantum data received at another device (e.g., the first device). The apparatus 300 also includes means, such as processor 302, memory 304, key check value circuitry 318, and/or the like, for comparing the first key check value and a second key check value (e.g., the key check value generated by the host device). The apparatus 300 also includes means, such as processor 302, memory 304, key check value circuitry 318, and/or the like, for determining whether the first key check value satisfies the second key check value. In response to determining that the first key check value satisfies the second key check value, the apparatus 300 also includes means, such as processor 302, memory 304, communications hardware 306, and/or the like, for causing transmission of a confirmation message indicating the first key check value satisfied the second key check value. In response to determining that the first key check value does not satisfy the second key check value, the apparatus 300 includes means, such as processor 302, memory 304, communications hardware 306, and/or the like, for causing transmission of a warning message indicating a discrepancy between the first key check value and the second key check value.

As described above, example embodiments provide methods and apparatuses that enable improved quantum key distribution (QKD) to mitigate the issues faced by both traditional QKD systems and traditional key exchange protocols reliant on KLDs. Example embodiments thus provide tools that overcome the problems faced by traditional implementations of QKD by providing a mobile MQKD device capable of generating entangled particles and measuring entangled particles. And by avoiding the need to physically transport keys over a distance, example embodiments significantly reduce the risk of MITM attacks that has been unavoidable in the past when using KLD key delivery procedures. Additionally, by automating functionality such as log generation and secure key matching confirmation (e.g., through use of key check values) that has historically required manual human analysis, the speed and consistency of the evaluations performed by example embodiments unlocks many potential new functions that have historically not been available, such as the ability to conduct faster cyberattack detection.

As these examples all illustrate, example embodiments contemplated herein provide technical solutions that solve real-world problems faced during quantum key distribution. And while the shortcomings of traditional key exchange tools have been an issue, the recently exploding amount of data made available by recently emerging technology today has made this problem significantly more acute, as the demand for quantum-based solutions for data security has grown significantly. At the same time, the recently arising ubiquity of smaller hardware capable of generating quantum data has unlocked new avenues to solving this problem that historically were not available, and example embodiments described herein thus represent a technical solution to these real-world problems.

FIGS. 4-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for mobile quantum key distribution, the method comprising:
    establishing, by communications hardware of a mobile quantum key distribution (MQKD) device when located at a first location of a first device, a first connection between the MQKD device and the first device;
    determining, by quantum analysis circuitry of the MQKD device, whether the first device is quantum-enabled;
    generating, by entangled particles generation hardware of the MQKD device, a pair of entangled particles;
    injecting, by the communications hardware of the MQKD device when located at the first location, first quantum data that is based on a first particle of the pair of entangled particles into the first device via the first connection between the MQKD device and the first device, wherein injecting the first quantum data into the first device comprises:
        in response to determining that the first device is quantum-enabled:
            transmitting, by the communications hardware of the MQKD device, the first particle of the pair of entangled particles to the first device, or
        in response to determining that the first device is not quantum-enabled:
            generating, by a secure key generator of the MQKD device, a first secure key based on the first particle of the pair of entangled particles; and transmitting, by the communications hardware of the MQKD device, the first secure key to the first device;

establishing, by the communications hardware of the MQKD device when located at a second location of a host device, a second connection between the MQKD device and the host device; and injecting, by the communications hardware of the MQKD device when located at the second location, second quantum data that is based on a second particle of the pair of entangled particles into the host device via the second connection between the MQKD device and the host device to facilitate secure communication between the host device and the first device based at least on the pair of entangled particles.

2. The method of claim 1, further comprising:

determining, by quantum analysis circuitry of the MQKD device, whether the host device is quantum-enabled, wherein, in response to determining that the host device is not quantum-enabled, injecting the second quantum data into the host device comprises:

generating, by a secure key generator of the MQKD device, a second secure key based on the second particle of the pair of entangled particles; and transmitting, by the communications hardware of the MQKD device, the second secure key to the host device, and wherein, in response to determining that the host device is quantum-enabled, injecting the second quantum data into the host device comprises transmitting, by the communications hardware of the MQKD device, the second particle of the pair of entangled particles to the host device.

3. The method of claim 1, further comprising:

generating, by recordation circuitry of the MQKD device, a log file relating to the injection of the first quantum data into the first device and the injection of the second quantum data into the host device.

4. The method of claim 1, further comprising:

receiving, by the communications hardware of the MQKD device, and in response to injecting the first quantum data into the first device, a first key check value from the first device, wherein the first key check value is based on the first quantum data;

receiving, by the communications hardware of the MQKD device and in response to injecting the second quantum data into the host device, a second key check value from the host device, wherein the second key check value is based on the second quantum data;

comparing, by key check value circuitry of the MQKD device, the first key check value and the second key check value; and determining, by the key check value circuitry of the MQKD device and based on the comparison, whether the first key check value satisfies the second key check value.

5. The method of claim 4, further comprising, in response to determining that the first key check value does not satisfy the second key check value:

causing, by the communications hardware of the MQKD device, transmission of a warning message indicating a discrepancy between the first key check value and the second key check value.

6. The method of claim 4, further comprising, in response to determining that the first key check value satisfies the second key check value:

causing, by the communications hardware of the MQKD device, transmission of a confirmation message indicating the first key check value satisfies the second key check value.

7. The method of claim 1, wherein the MQKD device is embodied by a drone.

8. The method of claim 1, further comprising:

zeroizing, by a secure key generator, the first quantum data and the second quantum data and cryptographic material related to the first quantum data and the second quantum data at the MQKD device.

9. A mobile quantum key distribution (MQKD) device comprising:

entangled particles generation hardware configured to:
    generate a pair of entangled particles;
quantum analysis circuitry configured to:
    determine whether a first device is quantum enabled;
a secure key generator configured to:
    in response to determining that the first device is not quantum-enabled, generate a first secure key based on the first particle of the pair of entangled particles; and
communications hardware configured to:
    establish, when the MQKD device is located at a first location of the first device, a first connection between the MQKD device and the first device;
    inject, when the MQKD device is located at the first location, first quantum data that is based on a first particle of the pair of entangled particles into the first device via the first connection between the MQKD device and the first device,
        wherein the communications hardware is configured to, in response to determining that the first device is not quantum-enabled, inject the first quantum data into the first device by transmitting the first secure key to the first device, and
        wherein the communications hardware is configured to, in response to determining that the first device is quantum-enabled, inject the first quantum data into the first device by transmitting the first particle of the pair of entangled particles to the first device;
    establish, when the MQKD device is located at a second location of a host device, a second connection between the MQKD device and the host device; and
    inject, when the MQKD device is located at the second location, second quantum data that is based on a second particle of the pair of entangled particles into the host device via the second connection between the MQKD device and the host device to facilitate secure communication between the host device and the first device based at least on the pair of entangled particles.

10. The MQKD device of claim 9, further comprising:

quantum analysis circuitry configured to:
    determine whether the host device is quantum enabled; and
a secure key generator configured to:
    in response to determining that the host device is not quantum-enabled, generate a second secure key based on the second particle of the pair of entangled particles,
    wherein the communications hardware is configured to, in response to determining that the host device is not quantum-enabled, inject the second quantum data into the host device by transmitting the second secure key to the host device, and
    wherein the communications hardware is configured to, in response to determining that the host device is quantum-enabled, inject the second quantum data into the host device by transmitting the second particle of the pair of entangled particles to the host device.

11. The MQKD device of claim 9, further comprising:
recordation circuitry configured to:
   generate a log file relating to the injection of the first quantum data into the first device and the injection of the second quantum data into the host device.

12. The MQKD device of claim 11, wherein the communications hardware is further configured to cause transmission of the log file to a second device for validation.

13. The MQKD device of claim 9, wherein the communications hardware is further configured to:
   receive in response to injecting the first quantum data into the first device, a first key check value from the first device, wherein the first key check value is based on the first quantum data; and
   receive, in response to injecting the second quantum data into the host device, a second key check value from the host device, wherein the second key check value is based on the second quantum data; and
   wherein the MQKD device further comprises key check value circuitry configured to:
      compare the first key check value and the second key check value; and
      determine, based on the comparison, whether the first key check value satisfies the second key check value.

14. The MQKD device of claim 13, wherein the communications hardware is further configured to, in response to determining that the first key check value does not satisfy the second key check value:
   cause transmission of a warning message indicating a discrepancy between the first key check value and the second key check value.

15. The MQKD device of claim 13, wherein the communications hardware is further configured to, in response to determining that the first key check value satisfies the second key check value:
   cause transmission of a confirmation message indicating the first key check value satisfies the second key check value.

16. The MQKD device of claim 9, wherein the MQKD device is embodied by a drone.

17. The MQKD device of claim 9, further comprising:
a secure key generator configured to:
   zeroize the first quantum data and the second quantum data and cryptographic material related to the first quantum data and the second quantum data at the MQKD device.

18. A mobile quantum key distribution (MQKD) device comprising:
   means for establishing, when the MQKD device is located at a first location of a first device, a first connection between the MQKD device and the first device;
   means for determining whether the first device is quantum-enabled;
   means for generating a pair of entangled particles;
   means for injecting, when the MQKD device is located at the first location, first quantum data that is based on a first particle of the pair of entangled particles into the first device via the first connection between the MQKD device and the first device, wherein injecting the first quantum data into the first device comprises:
      in response to determining that the first device is quantum-enabled:
         transmitting the first particle of the pair of entangled particles to the first device, or
      in response to determining that the first device is not quantum-enabled:
         generating a first secure key based on the first particle of the pair of entangled particles; and
         transmitting the first secure key to the first device;
   means for establishing, when the MQKD device is located at a second location of a host device, a second connection between the MQKD device and the host device; and
   means for injecting, when the MQKD device is located at the second location, second quantum data that is based on a second particle of the pair of entangled particles into the host device via the second connection between the MQKD device and the host device to facilitate secure communication between the host device and the first device based at least on the pair of entangled particles.

* * * * *